United States Patent
Lee et al.

(10) Patent No.: US 9,124,502 B2
(45) Date of Patent: Sep. 1, 2015

(54) METHOD AND APPARATUS OF DETERMINING BLOCKING IN RING NETWORK

(71) Applicant: Electronics and Telecommunications Research Institute, Daejeon (KR)

(72) Inventors: Kwang-Koog Lee, Daejeon (KR); Jeong-dong Ryoo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 228 days.

(21) Appl. No.: 13/755,788

(22) Filed: Jan. 31, 2013

(65) Prior Publication Data

US 2013/0272128 A1 Oct. 17, 2013

(30) Foreign Application Priority Data

Apr. 16, 2012 (KR) .................. 10-2012-0039345

(51) Int. Cl.
| | |
|---|---|
| *H04L 12/22* | (2006.01) |
| *H04L 12/801* | (2013.01) |
| *H04L 12/729* | (2013.01) |
| *H04L 12/733* | (2013.01) |
| *H04L 12/721* | (2013.01) |
| *H04L 12/437* | (2006.01) |
| *H04L 12/42* | (2006.01) |

(52) U.S. Cl.
CPC .............. *H04L 47/12* (2013.01); *H04L 12/437* (2013.01); *H04L 45/122* (2013.01); *H04L 45/124* (2013.01); *H04L 45/125* (2013.01); *H04L 2012/421* (2013.01)

(58) Field of Classification Search
CPC ...... H04L 47/12; H04L 47/122; H04L 47/125; H04L 47/127; H04L 45/125; H04L 45/122; H04L 45/124; H04L 12/437; H04L 2012/421
USPC .............. 370/230, 230.1, 231, 235, 237–238, 370/422–424, 449–452, 455, 458–460, 462, 370/465
See application file for complete search history.

(56) References Cited

U.S. PATENT DOCUMENTS

| | | | | |
|---|---|---|---|---|
| 5,764,636 | A * | 6/1998 | Edsall ........................... | 370/401 |
| 7,688,716 | B2 * | 3/2010 | Pande et al. ................... | 370/222 |
| 8,737,198 | B1 * | 5/2014 | Holness et al. ............... | 370/222 |
| 2004/0223503 | A1 * | 11/2004 | Lynch et al. .................. | 370/404 |
| 2005/0243823 | A1 * | 11/2005 | Griswold et al. ............. | 370/389 |
| 2007/0165517 | A1 * | 7/2007 | Binetti et al. ................. | 370/222 |
| 2009/0268627 | A1 * | 10/2009 | De Frias Rebelo Nunes ........... | 370/252 |
| 2010/0165883 | A1 * | 7/2010 | Holness et al. ............... | 370/255 |
| 2010/0238813 | A1 * | 9/2010 | Allan et al. ................... | 370/252 |
| 2011/0019538 | A1 * | 1/2011 | Ryoo et al. ................... | 370/225 |
| 2011/0249551 | A1 * | 10/2011 | Rollins ......................... | 370/222 |
| 2011/0299388 | A1 * | 12/2011 | Wu et al. ...................... | 370/228 |
| 2012/0087277 | A1 * | 4/2012 | Wu et al. ...................... | 370/254 |
| 2012/0176935 | A1 * | 7/2012 | Wu ............................... | 370/254 |
| 2012/0250695 | A1 * | 10/2012 | Jia et al. ....................... | 370/400 |
| 2013/0003530 | A1 * | 1/2013 | Davari .......................... | 370/225 |
| 2014/0241148 | A1 * | 8/2014 | Ryoo et al. ................... | 370/222 |

\* cited by examiner

*Primary Examiner* — Kevin Mew (74) *Attorney, Agent, or Firm* — Nelson Mullins Riley & Scarborough LLP (57) ABSTRACT

An apparatus of determining blocking in an Ethernet ring network sets blocking with respect to each of the plurality of links in an Ethernet ring network, and determines one of the plurality of links as a link to be blocked by using traffic request amounts of a plurality of service flows with respect to the respective links set to be blocked.

20 Claims, 8 Drawing Sheets

METHOD AND APPARATUS OF DETERMINING BLOCKING IN RING NETWORK

CROSS-REFERENCE TO RELATED APPLICATION

This application claims priority to and the benefit of Korean Patent Application No. 10-2012-0039345 filed in the Korean Intellectual Property Office on Apr. 16, 2012, the entire contents of which are incorporated herein by reference.

BACKGROUND OF THE INVENTION (a) Field of the Invention

The present invention relates to a method of determining blocking in a ring network and, more particularly, to a method and apparatus of determining logical blocking set to prevent an infinite loop of Ethernet frames transferred in an Ethernet ring network.

(b) Description of the Related Art

In an Ethernet ring network, two ports of respective nodes are connected to ports of adjacent nodes to constitute a ring overall, and a certain link in the Ethernet ring network is blocked to prevent a transmission of Ethernet frames from forming an infinite loop, thus logically forbidding a ring formation. To this end, a predetermined particular port among several ports of the Ethernet ring network is blocked, and here, the blocked link is merely logically determined and a physical link exists, so the logical blocking is lifted, traffic can be immediately transferred.

When logical blocking is set in the Ethernet ring network, an Ethernet frame cannot be transmitted to the blocked link, so transmission paths of numerous service flows that may exist in the Ethernet ring network are determined by the set logical blocking irrespective of an optimum path. For example, in case in which the Ethernet ring network includes N number of links and N number of nodes and a traffic request amount of the service flows transmitted and received between respective nodes is determined by N×N matrix, the number of cases that one link is logically blocked by the logical blocking may be N. Also, since transmission paths between the respective nodes are changed due to each logical blocking, a total amount of traffic transferred through N number of links in the Ethernet ring network is changed. Thus, according to circumstances, traffic is concentrated on at least one link in the Ethernet ring network, causing traffic overload.

In the Ethernet ring network, as for a ring capacity, an equal bandwidth is provided in both directions for all the links, so the ring capacity is determined based on a link that transfers the largest amount of traffic. If a certain link exceeds the ring capacity due to arbitrarily set logical blocking in the Ethernet ring network, the ring capacity should be over-provisioned in order to prevent a loss of an Ethernet frame. As a result, in the network operator position, in order to prevent an unnecessary network over-provisioning for the Ethernet ring network, a scheme for minimizing the ring capacity of the Ethernet ring network by selecting an optimal logical blocking position may be required.

Also, unlike minimization of the ring capacity of the Ethernet ring network, a traffic overload due to logical blocking arbitrarily set in the Ethernet ring network may be prevented through logical blocking that minimizes a traffic request amount of every service flow existing in the Ethernet ring network, so a scheme for logical blocking that minimizes a traffic request amount of every service flow may also be required.

SUMMARY OF THE INVENTION

The present invention has been made in an effort to provide a method and apparatus of determining blocking in a ring network having advantages of effectively distributing traffic by minimizing a ring capacity or a traffic request amount in a ring network.

An exemplary embodiment of the present invention provides a method of determining logical blocking by a blocking determining apparatus of an Ethernet ring network in which nodes are connected by links. The blocking determining method includes: setting blocking with respect to each of a plurality of links in the Ethernet ring network and calculating a traffic request amount of a plurality of service flows in the Ethernet ring network; determining one of the plurality of links as a link to be blocked based on the traffic request amounts calculated according to the setting of blocking of each link; and blocking one of two ports connected through the blocked link.

The calculating may include calculating the total of the traffic request amounts of the plurality of service flows with respect to each of the links set to be blocked, and the determining may include determining a link having a minimum value among the totals of the traffic request amounts of the links set to be blocked, as the link to be blocked.

The calculating of the total of the traffic request amounts may include: sequentially setting blocking with respect to the plurality of links; setting routing having a minimum number of hops with respect to the plurality of service flows according to the links set to be blocked; and calculating the totals of traffic request amounts of the plurality of service flows according to the set routing.

The calculating may include: calculating a traffic request amount according to routing having a minimum number of hops with respect to the plurality of service flows; when a link included in the routing having a minimum number of hops is set to be blocked, calculating traffic request amounts of the plurality of service flows according to routing having a maximum number of hops; and calculating a difference between the traffic request amounts of the plurality of service flows according to the routing having a minimum number of hops and the traffic request amounts of the plurality of service flows according to the routing having a maximum number of hops with respect to each of the links set to be blocked.

The determining may include determining a link having a minimum value among the differences calculated for each of the links set to be blocked, as the link to be blocked.

The calculating may include calculating a capacity of each link with respect to the plurality of service flows by using the traffic request amounts calculated according to the setting of blocking of the respective links, and the determining may include determining a link having a minimum value among the calculated capacities of the respective links, as the link to be blocked.

The calculating may include: sequentially setting blocking with respect to the plurality of links; setting routing with respect to the plurality of service flows according to the links set to be blocked; and calculating the totals of traffic request amounts in a clockwise direction and counterclockwise direction with respect to the plurality of service flows of the other remaining links excluding the link set to be blocked among the plurality of links according to the set routing, with respect to each of the links set to be blocked, and extracting a maximum value from among the totals.

The determining may include determining a link having a minimum value among maximum values extracted with respect to each of the links set to be blocked, as the link to be blocked.

The setting of routing may include: setting routing having a minimum number of hops with respect to the plurality of service flows.

The calculating may include: setting routing to minimize an increase in a ring capacity with respect to the plurality of service flows; calculating traffic request amounts of respective links with respect to the plurality of service flows according to the set routing; sequentially setting blocking with respect to links included in the set routing, starting from a service flow having the largest traffic request amount among the plurality of service flows and calculating increment and decrement of traffic in the clockwise direction and counterclockwise direction with respect to the plurality of service flows of the other remaining links excluding the link set to be blocked among the plurality of links; and calculating maximum values of the sums of the traffic increment and decrement amounts in the clockwise and counterclockwise directions calculated for each of the links set to be blocked and the traffic request amounts of the respective links with respect to the plurality of service flows according to the set routing.

The setting of routing may include: aligning the plurality of service flows in descending order based on the traffic request amounts of the service flows; and setting routing in which the traffic request amounts of the respective links minimize an increase in a ring capacity, starting from a service flow having the largest traffic request amount among the plurality of service flows.

Another embodiment of the present invention provides an apparatus of determining blocking in an Ethernet ring network in which nodes are connected by links. The blocking determining apparatus may include a calculation unit and a determining unit. The calculation unit may set blocking with respect to each of the plurality of links in the Ethernet ring network, and calculate traffic request amounts of the plurality of service flows with respect to each of the links set to be blocked. The determining unit may determine one of the plurality of links as a link to be blocked by using the traffic request amounts of the plurality of service flows with respect to the respective links set to be blocked.

The calculation unit may calculate the totals of the traffic request amounts of the plurality of service flows with respect to respective links set to be blocked, and the determining unit may determine a link having a minimum value among the totals of the traffic request amounts of the links set to be blocked.

The calculation unit may calculate the traffic request amounts according to routing having a minimum number of hops with respect to the plurality of service flows, and when a link included in the routing having a minimum number of hops is set to be blocked, the calculation unit may calculate traffic request amounts according to routing having a maximum number of hops with respect to the plurality of services, and may calculate differences between traffic request amounts according to the routing having a minimum number of hops and the traffic request amounts according to the routing having a maximum number of hops with respect to the plurality of service flows. The determining unit may determine a link having a minimum value among the differences calculated for the respective links set to be blocked, as the link to be blocked.

Yet another embodiment of the present invention provides an apparatus of determining blocking in an Ethernet ring network in which nodes are connected by links. The blocking determining apparatus may include a calculation unit and a determining unit. The calculation unit may set blocking with respect to each of the plurality of links in the Ethernet ring network, and calculate a capacity of each of the links set to be blocked with respect to the plurality of service flows by using traffic request amounts of the plurality of service flows. The determining unit may determine one of the plurality of links as a link to be blocked by using the capacity of each of the links set to be blocked.

The determining unit may determine a link having a minimum value among the capacities of the respective links set to be blocked, as a link to be blocked.

The calculation unit may set routing having a minimum number of hops with respect to the plurality of service flows according to the links set to be blocked, calculate the totals of traffic request amounts in a clockwise direction and a counterclockwise direction with respect to the plurality of service flows of the other remaining links excluding the link set to be blocked, among the plurality of links according to the routing of the plurality of service flows, with respect to the plurality of links set to be blocked, and extract maximum values from among the totals. The determining unit may determine a link having a minimum value among the maximum values extracted for each of links set to be blocked.

The calculation unit may calculate traffic request amounts of the respective links with respect to the plurality of service flows according to the routing set for the plurality of service flows, set blocking with respect to each of the links included in the set routing, starting from a service flow having the largest traffic request amount among the plurality of service flows, to calculate traffic increment and decrement amounts in the clockwise direction and counterclockwise direction with respect to the plurality of service flows of the other remaining links excluding the link set to be blocked among the plurality of links, and calculate maximum values of the sums of the traffic increment and decrement amounts in the clockwise and counterclockwise directions calculated for each of the links set to be blocked and the traffic request amounts of the respective links with respect to the plurality of service flows according to the set routing. The determining unit may determine a link having a minimum value among the maximum values, as the link to be blocked.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements.

A method of determining a link to be blocked in a ring network according to an embodiment of the present invention will be described in detail.

Figure 1:
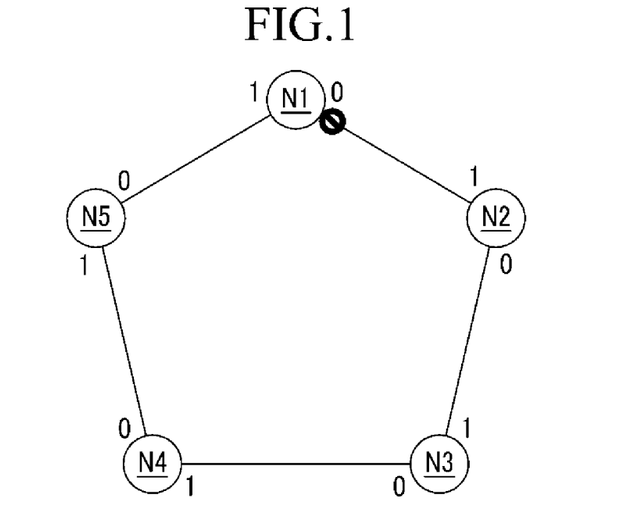
FIG. 1 is a view illustrating an example of an Ethernet ring network according to an embodiment of the present invention.
Figure 2:
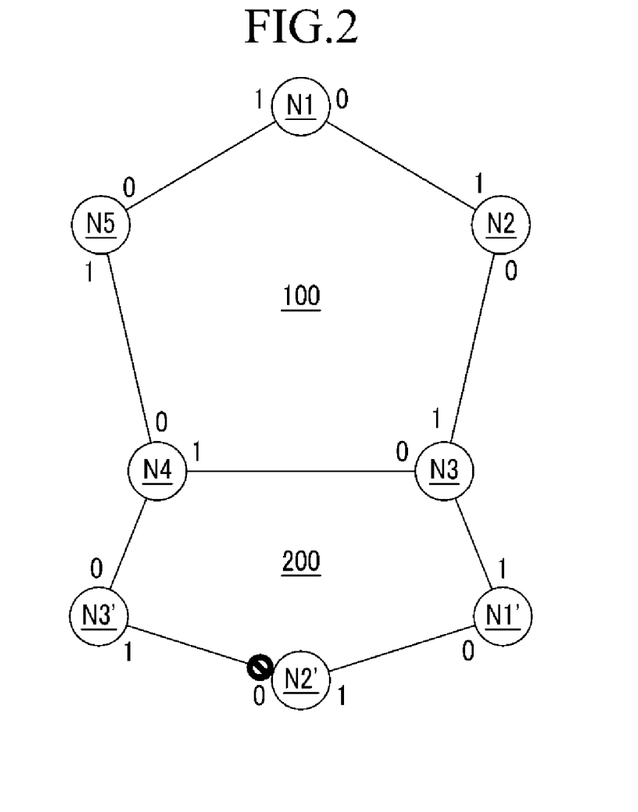
FIG. 2 is a view illustrating another example of the Ethernet ring network according to an embodiment of the present invention.

FIG. 1 is a view illustrating an example of an Ethernet ring network according to an embodiment of the present invention, and FIG. 2 is a view illustrating another example of the Ethernet ring network according to an embodiment of the present invention.

With reference to FIG. 1, an Ethernet ring network includes a plurality of nodes, e.g., five nodes N1 to N5, which are connected in a ring form. The respective nodes N1 to N5 include two ports 0 and 1 and connected to adjacent nodes by using the ports 0 and 1 to establish the Ethernet ring network. The port 0 of each of the nodes N1 to N5 is connected to the port 1 of a node adjacent in one direction, e.g., a clockwise direction, and the port 1 of each of the nodes N1 to N5 is connected to the port 0 of a node adjacent in the other direction, e.g., in a counterclockwise direction.

In the Ethernet ring network, a certain port is logically blocked in order to prevent a transmission of Ethernet frames from forming an infinite loop. Here, a link connected to a blocked port is called a ring protection link (RPL), and a node having the blocked port is called an RPL-holding node. In FIG. 1, it is illustrated that the port 0 of the node N1 is blocked.

Meanwhile, as shown in FIG. 2, an Ethernet ring network, for example, the Ethernet ring network 100 including the nodes N1 to N5 and an Ethernet ring network including nodes N1' to N3' may be connected to establish a multi-ring network. Here, the Ethernet ring network 200 may be connected to the ring network 100 through the nodes N3 and N4, and here, ports of the nodes N3 and N4 not used for a connection of the ring network 100 may be used for a connection with the ring network 200.

In this manner, the multi-ring network including a plurality of ring networks may be established as the sub-ring network 200 is hierarchically connected to the main ring network 100. In the ring network structure, when relative positions are considered, the main ring network 100 may be considered a higher ring network and the sub-ring network 200 may be considered a lower ring network of the higher ring network 100. The two ring networks, i.e., the higher ring network 100 and the lower ring network 200, are connected through the nodes N3 and N4, and here, the nodes N3 and N4 are called connection nodes.

In order to prevent a transmission Ethernet frames from forming an infinite loop, a certain port in the lower ring network 200 is also logically blocked, and in FIG. 2, it is illustrated that the port 0 of the node N2' is blocked.

Figure 3:
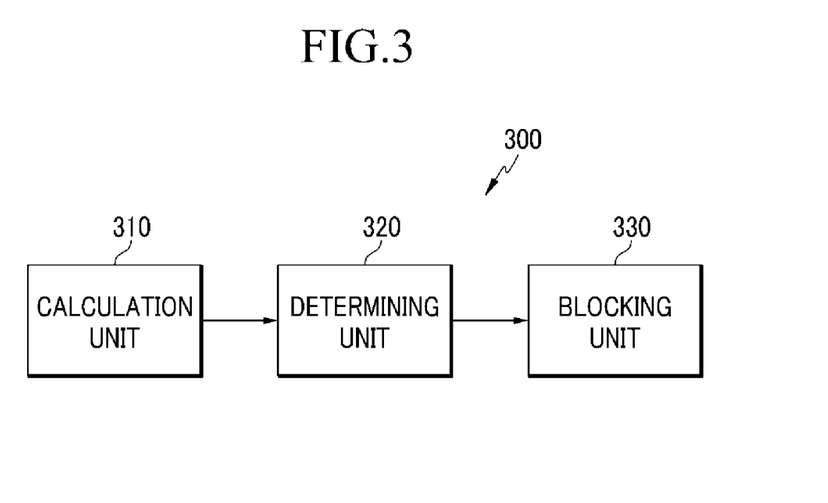
FIG. 3 is a view illustrating an apparatus of determining blocking in an Ethernet ring network according to an embodiment of the present invention.

FIG. 3 is a view illustrating an apparatus of determining blocking in an Ethernet ring network according to an embodiment of the present invention.

With reference to FIG. 3, the apparatus of determining blocking 300 (or blocking determining apparatus 300) in an Ethernet ring network includes a calculation unit 310, a determining unit 320, and a blocking unit 330.

In order to effectively distribute traffic transferred between nodes in the Ethernet ring network, the calculating unit 310 sets blocking in each link and obtains the total of traffic request amounts of service flows given in the Ethernet ring network based on the blocking results, or calculate a ring capacity of each link with respect to service flows given according to the blocking results in the Ethernet ring network.

The determining unit 320 determines a link having a minimum value among the totals of the traffic request amounts of the service flows given in the Ethernet ring network or a link having a minimum value among the link capacity values of the respective links, as a link to be blocked.

When the link to be blocked is determined, the blocking unit 330 blocks one of the two ports connected to the link to be blocked.

Hereinafter, for the sake of explanation, a method of determining logical blocking in an Ethernet ring network according to an embodiment of the present invention on the assumption that the Ethernet ring network in which the five nodes N1 to N5 are connected as illustrated in FIG. 1 has traffic request amounts (or usage amounts) as shown in Table 1 below will be described with reference to FIGS. 4 to 6.

In Table 1, k is a service flow, and Sk and Dk are a source and a destination of a relevant service flow, respectively. $x_k$ is a traffic request amount of a relevant service flow.

TABLE 1

| k | (Sk, Dk) | $x_k$ |
|---|----------|-------|
| 1 | (N1, N4) | 10 Mbps |
| 2 | (N3, N2) | 40 Mbps |
| 3 | (N1, N5) | 70 Mbps |
| 4 | (N2, N5) | 20 Mbps |

FIGS. 4A to 4E are flow charts illustrating a method of determining blocking capable of minimizing the total of traffic request amounts of service flows in the Ethernet ring network according to a first embodiment of the present invention, respectively. Numbers shown in FIGS. 4A to 4E indicate traffic request amounts of the respective service flows in the respective links.

The blocking determining apparatus 300 may obtain the totals of the traffic request amounts of the service flows in the Ethernet ring network through an algorithm 1 shown below, and determine a port having a minimum value among the totals of the traffic request amounts of the service flows in the Ethernet ring network, as a port to be blocked.

[Algorithm 1]

Figure 4A:
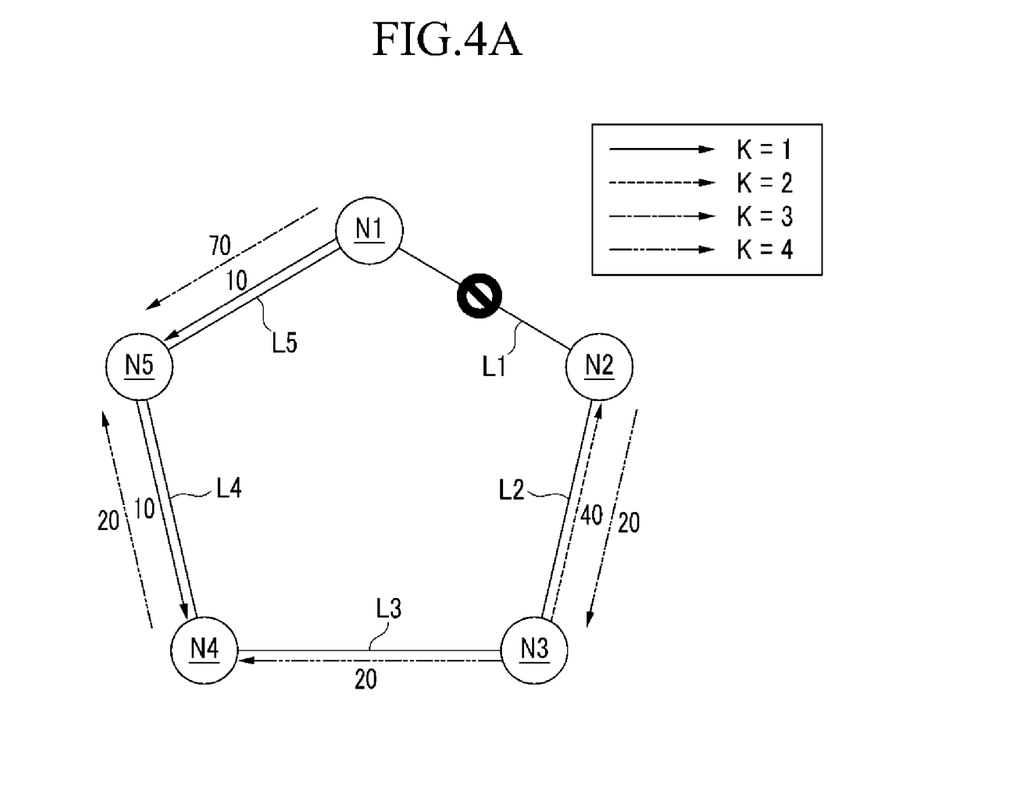
FIGS. 4A to 4E are flow charts illustrating a method of determining blocking capable of minimizing the total of traffic request amounts of service flows in the Ethernet ring network according to a first embodiment of the present invention, respectively.

Input : the service flow set K(K: service flow set)
01: for each link $l \in L$ do (L: link set)
02:     $o_l \leftarrow 0$
03: end for
04: for each link $l \in L$ do
05:     block the link $l$
06: : for each service flow $K \in K$ do
07:         $o_l \leftarrow o_l + x_k h_{k,b}$ ($h_{k,b}$: minimum number of hops of k)
08:     end for
09: end for
output : $\mathrm{argmin}_l \{o_l / l \in L\}$ and $\min \{o_l / l \in L\}$ Namely, as shown in FIG. 4A, the blocking determining apparatus 300 sets to block the link L1 in the Ethernet ring network having five links L1 to L5. Thereafter, the blocking determining apparatus 300 sets routing having a minimum number of hops with respect to the four service flows (k=1, 2, 3, 4) given according to the blocking of the link L1 and obtains the totals of traffic request amounts of the four service flows (k=1, 2, 3, 4) according to the set routing. As shown in FIG. 4A, when the link L1 is set to be blocked, the total of traffic request amounts of the link L2 is 60 Mbps, and the total of traffic request amounts of the link L3 is 20 Mbps. Also, the total of traffic request amounts of the like L4 is 30 Mbps, and that of traffic request amounts of the link L5 is 80 Mbps. Thus, when the link L1 is blocked, the total of the traffic request amounts of the four service flows (k=1, 2, 3, 4) in the Ethernet ring network is 190 Mbps.

Figure 4B:
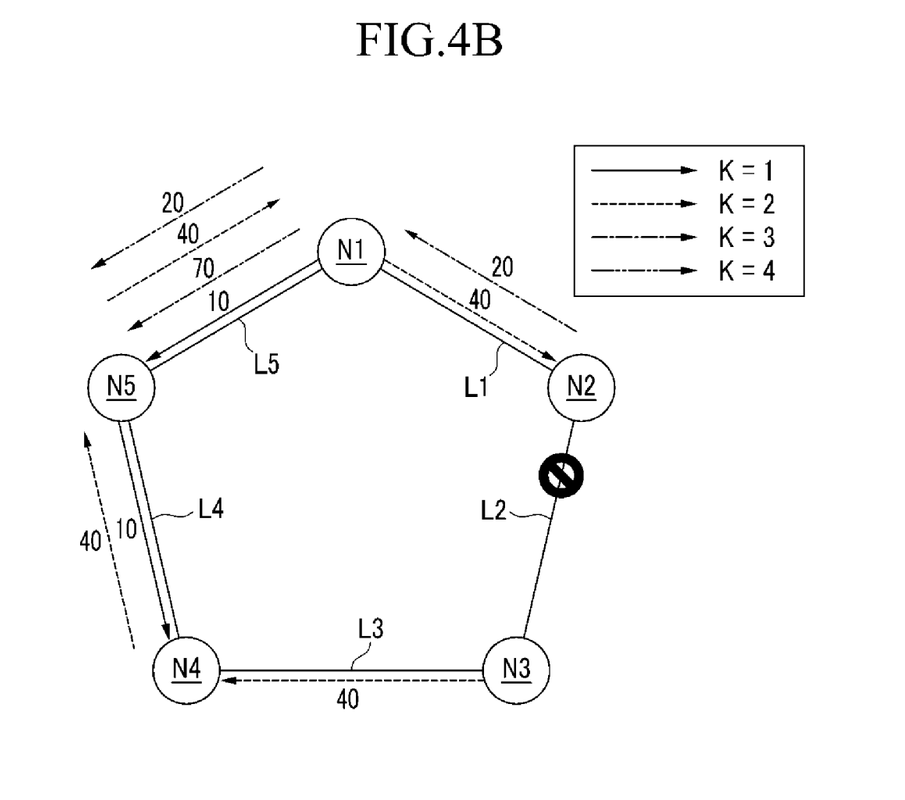

Subsequently, as shown in FIG. 4B, the blocking determining apparatus 300 sets blocking with respect to the link L2, sets routing having a minimum number of hops with respect to the four service flows (k=1, 2, 3, 4) given according to the blocking of the link L2, and obtains the total of traffic request amounts of the four service flows (k=1, 2, 3, 4) according to the set routing. As shown in FIG. 4B, when the link L2 is set to be blocked, the total of traffic request amounts of the link L1 is 60 Mbps, and the total of traffic request amounts of the link L3 is 40 Mbps. Also, the total of traffic request amounts of the like L4 is 50 Mbps, and that of traffic request amounts of the link L5 is 140 Mbps. Thus, when the link L2 is blocked, the total of the traffic request amounts of the four service flows (k=1, 2, 3, 4) in the Ethernet ring network is 290 Mbps.

Figure 4C:
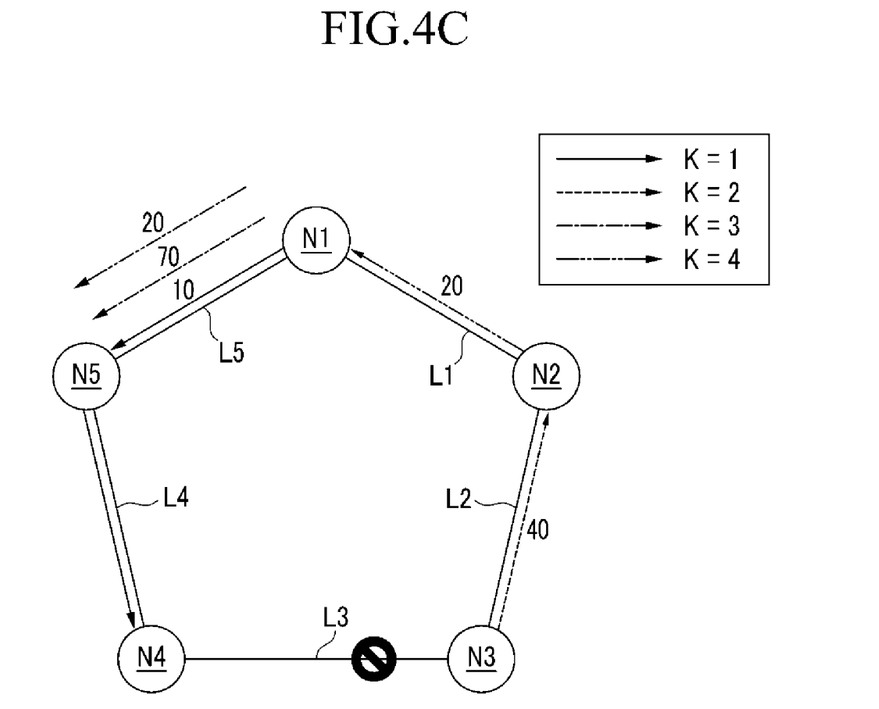
Figure 4D:
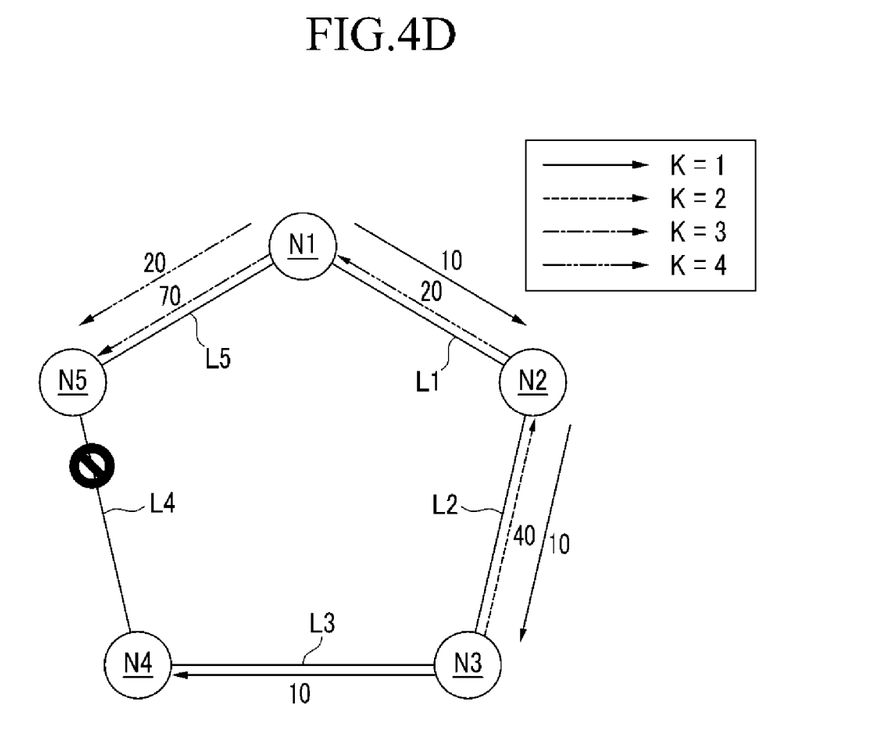
Figure 4E:
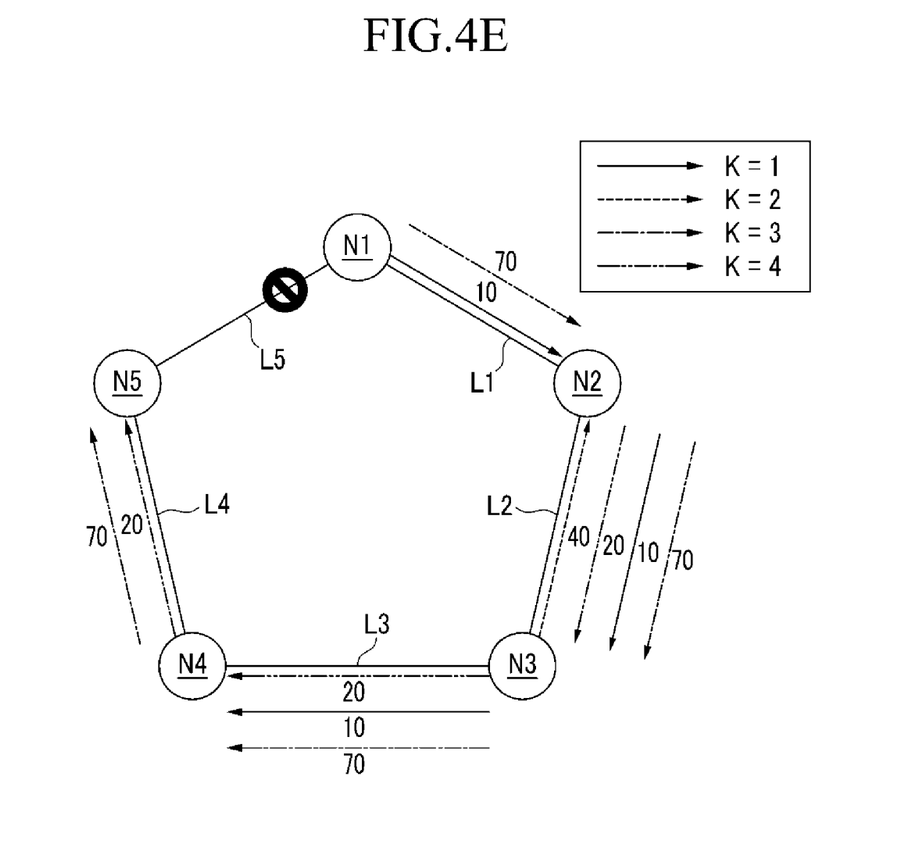

In this manner, the links L3 to L5 are sequentially set to be blocked and the total of the traffic request amounts of the four service flows according to the blocking results are obtained as shown in FIGS. 4C to 4E. The total ($o_l$) of the traffic request amounts of the four service flows when each of the links is blocked may be obtained as shown in Table 2 below.

TABLE 2

| Block | $o_l$ |
|---|---|
| L1 | 190 Mbps |
| L2 | 290 Mbps |
| L3 | 170 Mbps |
| L4 | 180 Mbps |
| L5 | 410 Mbps |

Next, the blocking determining apparatus 300 determines the link 13 having a minimum value (170 Mbps) among the totals ($o_l$) of the traffic request amounts of the service flows given according to the blocking of the link, as a link to be blocked.

However, with the blocking determining method based on the algorithm 1, since the respective service flows in the five respective links L1 to L5 should be routed, increasing calculation complexity. Thus, in order to reduce calculation complexity, the blocking determining apparatus 300 may determine a port to be blocked through an algorithm 2 shown below.

[Algorithm 2]

Input : the service flow K(K: service flow set)
01: $o \leftarrow 0$ and $o^* \leftarrow 0$ (L: link set)
02: for each link $l \in L$ do
03:     $\Delta_l \leftarrow 0$
04: end for
05: : for each service flow $h \in k$ do
06: :       $o^* \leftarrow o^* + x_k h_{k,min}$ ($h_{k,min}$: minimum number of hops of k)
07: for each link $l \in I.^*$ do
08:         $\Delta_l \leftarrow \Delta_l + x_k h_{i,max} - h_{k,min}$ ($h_{k,min}$: maximum number of hops of k)
09:     end for
10: end for
11: $o \leftarrow o^* + \min \{\Delta_l, l \in L\}$
output : $\mathrm{argmin}_l \{\Delta_l / l \in L\}$ and $o$ The algorithm 2 will be described in detail with reference to FIG. 5.

Figure 5:
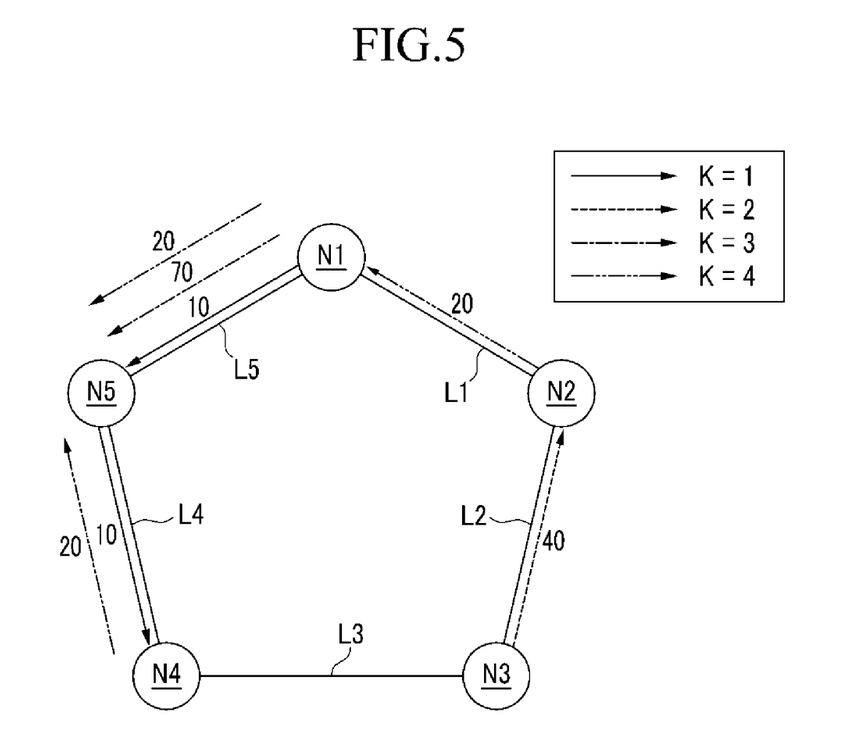
FIG. 5 is a view illustrating traffic amounts of respective service flows according to routing to explain a method of determining blocking capable of minimizing the total of traffic request amounts in the Ethernet ring network according to a second embodiment of the present invention.

FIG. 5 is a view illustrating traffic amounts of respective service flows according to routing to explain a method of determining blocking capable of minimizing the total of traffic request amounts in the Ethernet ring network according to a second embodiment of the present invention.

The blocking determining apparatus 300 initializes a variable ($o^*$) indicating a traffic request amount in routing having a minimum number of hops when there is no logical blocking with respect to the four given service flows (k=1, 2, 3, 4) and a variable (o) indicating a traffic request amount in routing in the opposite direction to that of a routing path having a minimum number of hops when a link included in the routing having a minimum number of hopes is blocked. The routing in the opposite direction to that of the routing path having a minimum number of hops refers to routing having a maximum number of hops.

Next, as shown in FIG. 5, when there is no logical blocking with respect to the service flows (k=1, 2, 3, 4), the blocking determining apparatus 300 calculates a traffic request amount in routing having a minimum number of hops, and when a link (L5 or L4 in case of k=1) included in routing having the minimum number of hops, the blocking determining apparatus 300 calculates a traffic request amount according to routing having the minimum number of hops. The calculated traffic request amounts of the service flows (k=1, 2, 3, 4) are shown in Table 3 below. In Table 3, $x_k * h_{k,min}$ is a traffic request amount of a service flow k in routing having a minimum number of hops, and $x_k * h_{k,max}$ is a traffic request amount of the service flow k in routing having a maximum number of hops.

TABLE 3

| k | (Sk, Dk) | $x_k$ | $x_k * h_{k,min}$ | $x_k * h_{k,max}$ |
|---|---|---|---|---|
| 1 | (N1, N4) | 10 Mbps | 10*2 = 20 | 10*3 = 30 |
| 2 | (N3, N2) | 40 Mbps | 40*1 = 40 | 40*4 = 160 |
| 3 | (N1, N5) | 70 Mbps | 70*1 = 70 | 70*4 = 280 |
| 4 | (N2, N5) | 20 Mbps | 20*2 = 40 | 20*3 = 60 |

Next, in case of setting blocking with respect to each of five links L1 to L5, the blocking determining apparatus 300 calculates differences ($\Delta$) between traffic request amounts in routing having a maximum number of hops of service flows that pass through the links set to be blocked and traffic request amounts in routing having a minimum number of hops of the service flows that pass through the links set to be blocked, and calculates the totals of the differences.

The totals of the differences between the traffic request amounts in routing having the maximum number of hops of the service flows according to the setting of blocking of the respective links L1 to L5 and the traffic request amounts in routing having the minimum number of hops thereof may be obtained as shown in Table 4.

TABLE 4

| Block | Δ | TOTAL |
|---|---|---|
| L1 | 20(k = 4) | 20 |
| L2 | 120(k = 2) | 120 |
| L3 | | 0 |
| L4 | 10(k = 1) | 10 |
| L5 | 10(k = 1), 210(k = 3), 20(k = 4) | 240 |

The blocking determining apparatus 300 may determine the link L3 in which the total of the difference between the traffic request amount in routing having a maximum number of hops of the services given according to the blocking of the links and the traffic request amount (Δ) in routing having a minimum number of hops is minimized (zero), as a link to be blocked.

In this manner, in the method of determining blocking according to the algorithm 2, since single routing may be performed on the four given services, calculation complexity thereof is significantly reduced in comparison to the algorithm 1.

Also, since the link in which the total of the traffic request amounts in the Ethernet ring network is minimized is set to be a link to be blocked, a network bandwidth can be saved, operation costs can be reduced, and traffic can be effectively distributed in the Ethernet ring network.

Next, a blocking determining method capable of minimizing a ring capacity in the Ethernet ring network will be described.

The blocking determining apparatus 300 may set logical blocking on each of the links through the algorithm 3 to thereby determine a link in which a ring capacity with respect to all the service flows give in the Ethernet ring network is minimized, as a link to be blocked.

[Algorithm 3]

```
Input : the service flow K(K: service flow set)
01: for each link i∈ L do (L: link set)
02:     for each link j∈L do
03:         0_{i,j+} <- 0, and 0_{i,j-} <- 0
04:     end for
05:     block the link i
06:     for each service flow k ∈ K do
07:         if k is routed in the clockwise direction then
08:             for each link j ∈ L_{k+} do
09:                 0_{i,j+} <- 0_{i,j+} x_K
10:             end for
11:         else
12:             for each link j ∈ L_{k−} do
13:                 0_{i,j−} <- 0_{i,j−} + x_K
14:             end for
15:         end if
16:     end for
17:     mi <- max(max{0_{i,j+} | j∈L}, max{0_{i,j−} | j∈L})
18: end for
output : argmin_i{m_i/i∈_L} and min{ m_i /i∈_L}
```

In detail, the blocking determining apparatus 300 initializes variables ($o_{i,j}^+$, $o_{i,j}^-$) representing traffic request amounts according to routing of four service flows (k=1, 2, 3, 4) given in a clockwise direction and a counterclockwise direction with respect to all the links existing in the Ethernet ring network.

As shown in FIG. 4A, the blocking determining apparatus 300 sets blocking with respect to the link L1 in the Ethernet ring network having the five links L1 to L5. Thereafter, the blocking determining apparatus 300 calculates the totals ($o_{i,j}^+$) of traffic request amounts according to routing of the four service flows (k=1, 2, 3, 4) in the clockwise direction and the totals of ($o_{i,j}^-$) of traffic request amounts according to routing of the four service flows (k=1, 2, 3, 4) in the counterclockwise direction with respect to the other remaining links excluding the link set to be blocked, and extracts a maximum value among the calculated totals of the traffic request amounts. When the link L1 is set to be blocked, the totals of the traffic request amounts of the respective links in the clockwise direction are 20 Mbps (k=4_L2), 20 Mbps (k=4_L3), 20 Mbps (k=4_L4)], respectively, and the totals of the traffic request amounts of the respective links in the counterclockwise direction are 40 Mbps (k=2_L2), 10 Mbps (k=1_L4), 80 Mbps (k=3+k=1_L5), respectively. Among them, a maximum value is 80 Mbps. Here, K=2_L2 refers to a service flow 2 in the link L2.

Next, in the Ethernet ring network having the five links L1 to L5, after the blocking determining apparatus 300 sets blocking with respect to the link L2 as shown in FIG. 4B, the blocking determining apparatus 300 calculates totals of the traffic request amounts according to routing of the four service flows (k=1, 2, 3, 4) in the clockwise direction with respect to all the links and the totals of the traffic request amounts according to routing of the four service flows (k=1, 2, 3, 4) in the counterclockwise direction with respect to all the links according to the foregoing method, and extracts a maximum value (100 Mbps) from among the totals of 40 Mbps (k=2_L1), 40 Mbps (k=2_L3), 40 Mbps (k=2_L4), and 40 Mbps (k=2_L5)] of the traffic request amounts of the respective links in the clockwise direction and the totals of [20 Mbps (k=4_L1), 100 Mbps (k=1+k=3+k=4_L5), 10 Mbps (k=1_L4)] of the traffic request amounts of the respective links in the counterclockwise direction.

In this manner, as shown in FIGS. 4C to 4E, the blocking determining apparatus 300 sequentially sets blocking with respect to the links L3 to L5, and extracts a maximum value among the totals of the traffic request amounts in the clockwise direction according to routing of the four service flows (k=1, 2, 3, 4) and the totals of traffic request amounts in the counterclockwise direction with respect to the other remaining links excluding the link set to be blocked. Accordingly, as shown in Table 5, the maximum value among the totals of the traffic request amounts in the clockwise direction and the totals of the traffic request amounts in the counterclockwise direction with respect to the other remaining links excluding the link set to be blocked according to blocking of the respective links may be obtained.

TABLE 5

| Block | $m_1$ |
|---|---|
| L1 | 80 Mbps |
| L2 | 100 Mbps |
| L3 | 100 Mbps |
| L4 | 90 Mbps |
| L5 | 100 Mbps |

The blocking determining apparatus 300 may determine the link L1 having a minimum value (80 Mbps) among the maximum values of the traffic request amounts of the other remaining links excluding the link set to be blocked, as a link to be blocked, such that the capacity of each link is minimized according to blocking of the links.

Like the algorithm 1, in the blocking determining method according to the algorithm 3, the service flows should be routed for each of the five links, calculation complexity is increased. Thus, in order to reduce calculation complexity, the blocking determining apparatus 300 may determine a port to be blocked through an algorithm 4 shown below.

[Algorithm 4]

```
Input : the service flow K(K: service flow set)
01: for each link l ∈ L do 01 (L: : link set)
02:         0_{i+} <- 0 and 0_{i-} <- 0
03:         for each link j ∈ L do
04:             0_{i,j+} <- 0 and 0_{i,j+} <- 0
05:         end for
06: end for
07: sort service flows in descending order of x_K
08: for each service flow k ∈ k in descending order do
09:     for each link i ∈ L do
10:         t_{i+} <- 0_{i+} and t_{i-} <- 0_{i-}
11:     end for
12:     for each link i ∈ L_{k+} do
13:         t_{i+} <- t_{i+} + x_K
14:     end for
15:     c+ <- max{ t_i* / i ∈ L_{k+} }
16:     for each link i ∈ L_{k-} do
17:         t_{i-} <- t_{i1-} + x_K
18:     end for
19:     c- <- max{ t_i* / i ∈ L_{k-} }
20:     if c+ < c- or (c+ = c- and h_{k+} < h_{k-} ) then
21:         for each link i ∈ L_{k+} do
22:             0_{i+} <- t_{i+}
23:         end for
24:         for each link i ∈ L_{k+} do
25:             for each link j ∈ L_{k+} do
26;                 0_{i,j+} <- 0_{i,j+} - x_K
27:     end for
```

The algorithm 4 will be described in detail with reference to FIG. 6.

Figure 6:
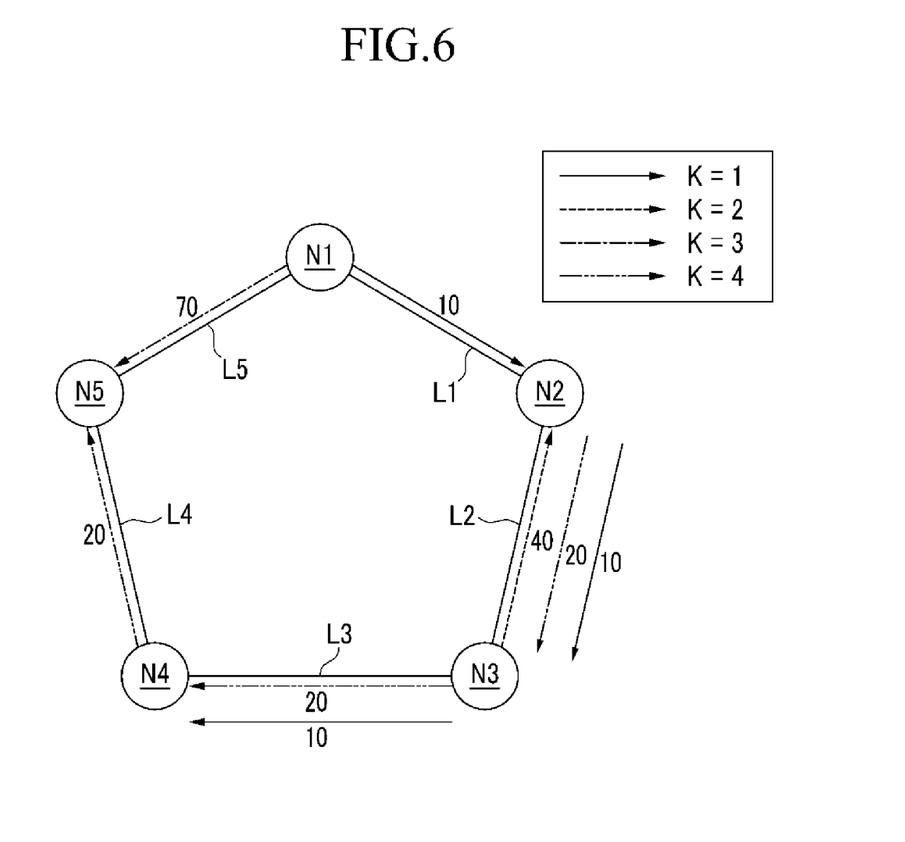
FIG. 6 is a view illustrating traffic amounts of the respective service flows according to routing in order to explaining a method of determining blocking capable of minimizing a ring capacity in the Ethernet ring network according to the second embodiment of the present invention.

FIG. 6 is a view illustrating traffic amounts of the respective service flows according to routing in order to explaining a method of determining blocking capable of minimizing a ring capacity in the Ethernet ring network according to the second embodiment of the present invention.

First, the blocking determining apparatus 300 aligns the service flows in descending order as shown in Table 6 below based on the traffic request amounts of the respective service flows.

TABLE 6

| k | (Sk, Dk) | $x_k$ |
|---|----------|-------|
| 3 | (N1, N5) | 70 Mbps |
| 2 | (N3, N2) | 40 Mbps |
| 4 | (N2, N5) | 20 Mbps |
| 1 | (N1, N4) | 10 Mbps |

Next, the blocking determining apparatus 300 sets routing by which a traffic request amount minimizes an increase in a ring capacity in a state in which blocking is not set for each service flow. In the algorithm 1, routing having a minimum number of hops is set, while, in the algorithm 4, routing allowing a traffic request amount to minimize an increase in a ring capacity is set.

Routing by which a traffic request amount minimizes an increase in the ring capacity in a state in which blocking is not set for each of the service flows may be set as shown in FIG. 6, and traffic request amounts of the respective links in such routing may be appear as shown in Table 7 below. In Table 7, C denotes clockwise direction, and CC denotes counterclockwise direction.

TABLE 7

| k | direction | L1 | L2 | L3 | L4 | L5 |
|---|-----------|----|----|----|----|----|
| 3 | C         |    |    |    |    |    |
|   | CC        |    |    |    |    | 70 Mbps |
| 2 | C         |    |    |    |    |    |
|   | CC        |    | 40 Mbps |  |  |  |
| 4 | C         |    |    | 20 Mbps | 20 Mbps | 20 Mbps |
|   | CC        |    |    |    |    |    |
| 1 | C         | 10 Mbps | 10 Mbps | 10 Mtps |  |  |
|   | CC        |    |    |    |    |    |

Next, with respect to the service flow (k=3) having the largest traffic request amount, the blocking determining apparatus 300 sets blocking with respect to the link L5 included in the set routing and calculates a traffic request amount increased and decreased in all the links L1 to L5 in case of setting the blocking. In case of the service flow (k=3), when the link L5 is set to be blocked, 70 Mbps of traffic request amount is increased in the clockwise direction in the links L1, L2, L3, and L4, and 70 Mbps of traffic request amount is reduced in the counterclockwise direction in the link L5.

Next, with respect to the service flow (k=2) having the second largest traffic request amount, the blocking determining apparatus 300 sets blocking with respect to the link L2 included in the set routing and calculates traffic request amounts increased and decreased in all the links L1 to L5 in the case of setting blocking. In case of the service flow (k=2), when the link L2 is blocked, 40 Mbps of traffic request amount is increased in the clockwise direction in the links L1, L3, L4, and L5, and −70 Mbps of traffic request amount is reduced in the counterclockwise direction in the link L2.

In this manner, the blocking determining apparatus 300 sets blocking with respect to each of the links included in the set routing with respect to all the service flows and calculates the traffic increment and decrement amounts in the clockwise direction and the traffic increment and decrement of all the links in the counterclockwise direction with respect to all the links.

The calculated traffic increment and decrement amounts according to blocking of the respective links may appear as shown in Table 8 below. In Table 8, C denotes clockwise direction, and CC denotes counterclockwise direction.

TABLE 8

| Block | direction | L1 | L2 | L3 | L4 | L5 |
|-------|-----------|----|----|----|----|----|
| L1    | C         | −10 Mbps | −10 Mbps | −10 Mbps |  |  |
|       | CC        |    |    |    | 10 Mbps | 10 Mbps |

TABLE 8-continued

| Block | direction | L1 | L2 | L3 | L4 | L5 |
|---|---|---|---|---|---|---|
| L2 | C | 40 Mbps<br>−10 Mbps | −20 Mbps<br>−10 Mbps | 40 Mbps<br>−20 Mbps<br>−10 Mbps | 40 Mbps<br>−20 Mbps | 40 Mbps |
|  | CC | 20 Mbps | −40 Mbps |  | 10 Mbps | 20 Mbps<br>10 Mbps |
| L3 | C | −10 Mbps | −20 Mbps<br>−10 Mbps | −20 Mbps<br>−10 Mbps | −20 Mbps |  |
|  | CC |  |  |  | 10 Mbps | 20 Mbps<br>10 Mbps |
| L4 | C |  | −20 Mbps | −20 Mbps | −20 Mbps |  |
|  | CC | 20 Mbps |  |  |  | 20 Mbps |
| L5 | C | 70 Mbps | 70 Mbps | 70 Mbps | 70 Mbps |  |
|  | CC |  |  |  |  | −70 Mbps |

After the traffic increment and decrement amounts according to the blocking of the respective links are calculated, the blocking determining apparatus 300 obtains maximum values of the sums of the traffic increment and decrement amounts according to the blocking of the respective links and the traffic request amounts of the respective links in routing the respective service flows illustrated in FIG. 7. The maximum values may be obtained as shown in Table 9 below.

TABLE 9

| Block | direction | Max |
|---|---|---|
| L1 | C |  |
|  | CC | 80 Mbps |
| L2 | C |  |
|  | CC | 100 Mbps(L5) |
| L3 | C |  |
|  | CC | 100 Mbps(L5) |
| L4 | C |  |
|  | CC | 90 Mbps(L5) |
| L5 | C | 100 Mbps(L5) |
|  | CC |  |

The blocking determining apparatus 300 determines the link L1 having a minimum value (80 Mbps) among the obtained maximum values, as a link to be blocked.

Accordingly, single routing may be performed on each of the four given service flows, so calculation complexity thereof can be significantly reduced in comparison to the algorithm 3. Also, since the link in which a ring capacity is minimized is set to be a link to be blocked, unnecessary network over-provisioning can be prevented and traffic can be effectively distributed in the Ethernet ring network.

According to an embodiment of the present invention, by determining logical blocking to minimize a ring capacity or a service traffic request amount, traffic can be effectively distributed in the ring network.

Also, by setting logical blocking to minimize a ring capacity in the Ethernet ring network, unnecessary over-provisioning of a network can be prevented in comparison to the related art ring network, and by setting logical blocking to minimize traffic request amounts of service flows, a network bandwidth can be saved and operational costs can be reduced.

The embodiments of the present invention may not necessarily be implemented only through the foregoing devices and/or methods but may also be implemented through a program for realizing functions corresponding to the configurations of the embodiments of the present invention, a recording medium including the program, or the like, and such an implementation may be easily made by a skilled person in the art to which the present invention pertains from the foregoing description of the embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of determining logical blocking by a blocking determining apparatus of an Ethernet ring network in which nodes are connected by links, the method comprising:
    setting blocking with respect to each of a plurality of links in the Ethernet ring network and calculating a traffic request amount of a plurality of service flows in the Ethernet ring network;
    determining one of the plurality of links as a link to be blocked based on the traffic request amounts calculated according to the setting of blocking of each link; and
    blocking one of two ports connected through the blocked link.

2. The method of claim 1, wherein the calculating comprises calculating the total of the traffic request amounts of the plurality of service flows with respect to each of the links set to be blocked, and
    the determining comprises determining a link having a minimum value among the totals of the traffic request amounts of the links set to be blocked, as the link to be blocked.

3. The method of claim 2, wherein the calculating of the total of the traffic request amounts comprises:
    sequentially setting blocking with respect to the plurality of links;
    setting routing having a minimum number of hops with respect to the plurality of service flows according to the links set to be blocked; and
    calculating the totals of traffic request amounts of the plurality of service flows according to the set routing.

4. The method of claim 1, wherein the calculating comprises:
    calculating a traffic request amount according to routing having a minimum number of hops with respect to the plurality of service flows;
    when a link included in the routing having a minimum number of hops is set to be blocked, calculating traffic request amounts of the plurality of service flows according to routing having a maximum number of hops; and
    calculating a difference between the traffic request amounts of the plurality of service flows according to the routing having a minimum number of hops and the traffic request amounts of the plurality of service flows according to the routing having a maximum number of hops with respect to each of the links set to be blocked.

5. The method of claim 1, wherein the determining comprises determining a link having a minimum value among the differences calculated for each of the links set to be blocked, as the link to be blocked.

6. The method of claim 1, wherein the calculating comprises calculating a capacity of each link with respect to the plurality of service flows by using the traffic request amounts calculated according to the setting of blocking of the respective links, and the determining comprises determining a link having a minimum value among the calculated capacities of the respective links, as the link to be blocked.

7. The method of claim 1, wherein the calculating comprises:

sequentially setting blocking with respect to the plurality of links;

setting routing with respect to the plurality of service flows according to the links set to be blocked; and calculating the totals of traffic request amounts in a clockwise direction and counterclockwise direction with respect to the plurality of service flows of the other remaining links excluding the link set to be blocked among the plurality of links according to the set routing, with respect to each of the links set to be blocked, and extracting a maximum value from among the totals.

8. The method of claim 7, wherein the determining comprises determining a link having a minimum value among maximum values extracted with respect to each of the links set to be blocked, as the link to be blocked.

9. The method of claim 7, wherein the setting of routing comprises:

setting routing having a minimum number of hops with respect to the plurality of service flows.

10. The method of claim 1, wherein the calculating comprises:

setting routing to minimize an increase in a ring capacity with respect to the plurality of service flows;

calculating traffic request amounts of respective links with respect to the plurality of service flows according to the set routing;

sequentially setting blocking with respect to links included in the set routing, starting from a service flow having the largest traffic request amount among the plurality of service flows and calculating increment and decrement of traffic in the clockwise direction and counterclockwise direction with respect to the plurality of service flows of the other remaining links excluding the link set to be blocked among the plurality of links; and calculating maximum values of the sums of the traffic increment and decrement amounts in the clockwise and counterclockwise directions calculated for each of the links set to be blocked and the traffic request amounts of the respective links with respect to the plurality of service flows according to the set routing.

11. The method of claim 10, wherein the determining comprises determining a link having a minimum value among the maximum values calculated for each of the links set to be blocked, as the link to be blocked.

12. The method of claim 10, wherein the setting of routing comprises:

aligning the plurality of service flows in descending order based on the traffic request amounts of the service flows; and setting routing in which the traffic request amounts of the respective links minimize an increase in a ring capacity, starting from a service flow having the largest traffic request amount among the plurality of service flows.

13. An apparatus of determining blocking in an Ethernet ring network in which nodes are connected by links, the apparatus comprising:

at least one processor configured to execute one or more units, the one or more units including:

a calculation unit configured to set blocking with respect to each of the plurality of links in the Ethernet ring network, and calculate traffic request amounts of the plurality of service flows with respect to each of the links set to be blocked; and a determining unit configured to determine one of the plurality of links as a link to be blocked by using the traffic request amounts of the plurality of service flows with respect to the respective links set to be blocked.

14. The apparatus of claim 13, wherein the calculation unit calculates the totals of the traffic request amounts of the plurality of service flows with respect to respective links set to be blocked, and the determining unit determines a link having a minimum value among the totals of the traffic request amounts of the links set to be blocked.

15. The apparatus of claim 13, wherein the calculation unit calculates the traffic request amounts according to routing having a minimum number of hops with respect to the plurality of service flows, and when a link included in the routing having a minimum number of hops is set to be blocked, the calculation unit calculates traffic request amounts according to routing having a maximum number of hops with respect to the plurality of services, and calculates differences between traffic request amounts according to the routing having a minimum number of hops and the traffic request amounts according to the routing having a maximum number of hops with respect to the plurality of service flows, and the determining unit determines a link having a minimum value among the differences calculated for the respective links set to be blocked, as the link to be blocked.

16. An apparatus of determining blocking in an Ethernet ring network in which nodes are connected by links, the apparatus comprising:

at least one processor configured to execute one or more units, the one or more units including:

a calculation unit configured to set blocking with respect to each of the plurality of links in the Ethernet ring network, and calculate a capacity of each of the links set to be blocked with respect to the plurality of service flows by using traffic request amounts of the plurality of service flows; and a determining unit configured to determine one of the plurality of links as a link to be blocked by using the capacity of each of the links set to be blocked.

17. The apparatus of claim 16, wherein the determining unit determines a link having a minimum value among the capacities of the respective links set to be blocked, as a link to be blocked.

18. The apparatus of claim 16, wherein the calculation unit sets routing having a minimum number of hops with respect to the plurality of service flows according to the links set to be blocked, calculates the totals of traffic request amounts in a clockwise direction and a counterclockwise direction with respect to the plurality of service flows of the other remaining links excluding the link set to be blocked, among the plurality of links according to the routing of the plurality of service flows, with respect to the plurality of links set to be blocked, and extracts maximum values from among the totals, and the determining unit determines a link having a minimum value among the maximum values extracted for each of links set to be blocked.

19. The apparatus of claim 16, wherein the calculation unit calculates traffic request amounts of the respective links with respect to the plurality of service flows according to the routing set for the plurality of service flows, sets blocking with respect to each of the links included in the set routing, starting from a service flow having the largest traffic request amount among the plurality of service flows, to calculate traffic increment and decrement amounts in the clockwise direction and counterclockwise direction with respect to the plurality of service flows of the other remaining links excluding the link set to be blocked among the plurality of links, and calculates maximum values of the sums of the traffic increment and decrement amounts in the clockwise and counterclockwise directions calculated for each of the links set to be blocked and the traffic request amounts of the respective links with respect to the plurality of service flows according to the set routing, and the determining unit determines a link having a minimum value among the maximum values, as the link to be blocked.

20. The apparatus of claim 19, wherein the calculation unit sets routing which minimizes an increase in a ring capacity with respect to the plurality of service flows by using the traffic request amounts of the plurality of service flows.

* * * * *